United States Patent
Leber et al.

(10) Patent No.: US 12,152,664 B2
(45) Date of Patent: Nov. 26, 2024

(54) LUBRICATION DIRECTING RING

(71) Applicant: Dana Heavy Vehicle Systems Group, LLC, Maumee, OH (US)

(72) Inventors: Mark W. Leber, Holland, OH (US);
Shane T. Smith, Sylvania, OH (US);
Justin Hall, Ottawa Lake, MI (US);
Langston H. Corn, Sylvania, OH (US);
Michael D. Cook, Holland, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 60 days.

(21) Appl. No.: 18/051,476

(22) Filed: Oct. 31, 2022

(65) Prior Publication Data
US 2024/0141983 A1    May 2, 2024

(51) Int. Cl.
*F16H 57/04*    (2010.01)
*F16H 57/08*    (2006.01)

(52) U.S. Cl.
CPC ..... *F16H 57/0482* (2013.01); *F16H 57/0431* (2013.01); *F16H 57/0479* (2013.01); *F16H 57/082* (2013.01)

(58) Field of Classification Search
CPC ............. F16H 57/0482; F16H 57/0431; F16H 57/0479; F16H 57/082
USPC ....................................................... 475/159
See application file for complete search history.

(56) References Cited

U.S. PATENT DOCUMENTS

| | | | |
|---|---|---|---|
| 3,821,908 A * | 7/1974 | Marsch | F16H 57/082 475/159 |
| 5,643,126 A * | 7/1997 | Hotta | F16H 57/0482 184/6.12 |
| 5,791,193 A * | 8/1998 | Uematsu | F16H 57/0471 475/159 |
| 5,910,063 A * | 6/1999 | Kato | F16H 57/0479 475/159 |
| 6,890,280 B2 * | 5/2005 | Oshidari | F16H 57/0479 184/6.12 |
| 7,229,376 B1 * | 6/2007 | Irwin | F16H 57/0483 475/160 |
| 8,215,454 B2 * | 7/2012 | Portlock | F02C 7/36 184/6.12 |

(Continued)

FOREIGN PATENT DOCUMENTS

| | | |
|---|---|---|
| CN | 100408884 C | 8/2008 |
| CN | 201166099 Y | 12/2008 |
| CN | 109630644 A | 4/2019 |

*Primary Examiner* — Colby M Hansen
(74) *Attorney, Agent, or Firm* — McCoy Russell LLP

(57) ABSTRACT

Systems are provided for a gearset for a vehicle transmission. In one example, a system includes a shaft comprising one or more lubricant holes oriented radially within the shaft, and one or more gears positioned radially around a central axis of the shaft. The system further includes a ring positioned circumferentially around the shaft. The ring is shaped with a radially extending portion and an axially extending portion, wherein the radially extending portion may direct lubricant flow from the radially oriented lubricant holes toward the axially extending portion, and the axially extending portion directs lubricant flow from the lubricant holes in an axial direction towards the one or more gears. The axially extending portion and radially extending portion form a cut in the ring.

20 Claims, 7 Drawing Sheets

(56) References Cited

U.S. PATENT DOCUMENTS

| | | | | |
|---|---|---|---|---|
| 8,905,885 B2* | 12/2014 | Yamamoto | ............... | B60K 6/26 |
| | | | | 184/6.12 |
| 11,662,015 B2* | 5/2023 | Hagerman | ........... | F16H 57/0484 |
| | | | | 475/252 |
| 11,767,910 B2* | 9/2023 | Brushkivskyy | ..... | F16H 57/0482 |
| | | | | 475/159 |
| 2005/0197226 A1* | 9/2005 | Yamamura | .......... | F16H 57/0482 |
| | | | | 475/159 |
| 2007/0111846 A1* | 5/2007 | Metten | ................. | F16H 57/082 |
| | | | | 475/331 |
| 2009/0028483 A1* | 1/2009 | Kawaguchi | ......... | F16C 33/6685 |
| | | | | 475/160 |
| 2009/0247348 A1* | 10/2009 | Haupt | ................. | F16C 33/6677 |
| | | | | 475/159 |
| 2011/0124461 A1* | 5/2011 | Torii | .................... | F16H 57/082 |
| | | | | 475/159 |
| 2012/0258834 A1* | 10/2012 | Winiasz | .................. | F03D 15/10 |
| | | | | 475/159 |
| 2015/0075363 A1 | 3/2015 | Bergmann | | |
| 2015/0267804 A1* | 9/2015 | Carlino | ............... | F16H 57/0482 |
| | | | | 475/159 |
| 2016/0025208 A1* | 1/2016 | McKinzie | ........... | F16H 57/0482 |
| | | | | 475/159 |
| 2016/0091082 A1* | 3/2016 | Boland | .................. | F03D 15/10 |
| | | | | 475/159 |
| 2016/0153545 A1* | 6/2016 | Kücükyavuz | ....... | F16H 57/0456 |
| | | | | 475/159 |
| 2022/0010875 A1* | 1/2022 | De Laet | ................ | F16H 57/046 |
| 2023/0167896 A1* | 6/2023 | Charrier | .............. | F16H 57/0457 |
| | | | | 475/159 |
| 2023/0407964 A1* | 12/2023 | Leber | ................... | F16H 57/031 |

* cited by examiner

LUBRICATION DIRECTING RING

TECHNICAL FIELD

The present description relates generally to a ring which directs lubrication fluid exiting a shaft to gears surrounding the shaft. The ring may improve lubrication and heat dissipation during operations.

BACKGROUND AND SUMMARY

Vehicles have a drive train that may include a transmission, such as an Ell transmission. A transmission of a vehicle includes a plurality of gearsets with a plurality of gears. Shafts as well as teeth of the gears may be lubricated with lubricating fluid to reduce friction and remove heat during operations.

Ell transmissions and other transmissions may use a Raveneaux gearset, which also may be spelled as Ravigneaux gearset. In a Raveneaux gearset two planetary gearsets may be nested together. The proximity of the two planet gears and sun gears creates difficulty in spraying enough lubricant on the faces and meshes of gear teeth to lubricate and dissipate heat from the gearset. Increasing the size of the sprayers, may increase the size of the Raveneaux gearset, reducing the advantage of compactness provided by the nested gearsets. The inner most gear members of a Raveneaux gearset may be subject to more friction and higher temperatures that may cause chronic or acute degradation. In examples, lubricant may be applied to the inner members of a Raveneaux or other type of gearset via a center drilled passage (for example a center drill) and radial holes located between the inner most gear members and outer most gear members along a longitudinal axis. However, such systems may encounter problems at high rotational speeds. The radial holes may not be directed toward the gear faces, and therefore at high speeds lubricant may be prevented from entering in large enough quantities to provide adequate lubrication. Additionally, due to high rotational speeds, lubricant that does enter between gears may be forced out of the meshes of the gears before providing adequate lubrication. Drilling holes in the gears of the gearset may increase the entry points for lubrication fluid to pass through the gears. However, such holes may decrease the structural integrity and increase the complexity of the gearsets, which may lead to unwanted stress, strain, and increased chances of degradation.

The inventors herein have recognized these and other issues with such systems and developed systems and methods addressing the issues. One example of a system is a sun gear shaft (also referred to as a sun shaft) comprising a Raveneaux gearset or another gearset, wherein, a ring may circumferentially surround the sun gear shaft near the gearset. The ring may have a side with a cut circumferentially surrounding the sun gear shaft. The cut may face toward the teeth mesh of gearset and the radial holes in the shaft. Within the circumference of ring and enclosed by the cut are the lubricant radial holes of the shaft.

The ring may direct lubricant from the holes in the shaft to the faces of the gears and between the intermeshed teeth of the gears. The holes extend radially within the shaft. The cutout and outer diameter of the ring may prevent lubricant from leaving gear faces and intermeshed gear teeth near where lubricant is splashed from entering other parts of a gear assembly. The cutout, outer diameter, and proximity of the ring to the intermeshed gear teeth creates a pocket to trap lubricant. Therefore, the ring may force oil or other lubricants axially across the gear teeth of the intermeshed gears without sprayers. The ring allows the Raveneaux gear to remain compact along an axis, such as the longitudinal axis, and may improve lubrication at higher speeds of rotation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to an assembly part of a gearset that may be used in a transmission. The gearset may be a Raveneaux gearset, which may also be spelled Ravigneaux gearset. The assembly may include a shaft, a plurality of gears members, a bearing, and a ring. The shaft may be a sun shaft, and the gear members may include a sun gear and a plurality of planet gears. The ring may direct fluid, such as a lubricant, leaving a plurality of holes to flow axially across the gear member. The ring may also be referred to herein as a director ring. The plurality of holes that extend radially from a sun shaft and/or sun gear. The ring may circumferentially surround portions of a shaft, such as a sun shaft, and/or a portion of a gear, such as a sun gear, to circumferentially surround a plurality of the holes through which lubricant may exit. A curved surface in the side and inner diameter (ID) of the ring creates a pocket to trap lubricant leaving the holes in the shaft forcing lubricant axially across the gear teeth. The curved surface may be a cut, such as a cutout. An example embodiment of the ring may comprise a curved surface extending 360 degrees around a sun shaft and/or sun gear. For another example, an embodiment of the ring may comprise a curved surface extending in a region of or about the holes. The curved surface may also prevent lubricant emerging from the gears from flowing in a direction opposite of the gear.

The ring may be used for a Raveneaux gearset, which may also be spelled Ravigneaux gearset. For one configuration, the ring may be positioned between the inner members and outer members of the Raveneaux gearset with respect to a central axis. However, the positioning of ring may be non-limiting, and the ring be located in other positions, such as to an exterior of a gearset. Additionally, the use of the ring may be non-limiting, and the ring may be used for non-Raveneaux gearsets, such as a Simpson gearset, spur gear differentials, other compound planetary gearsets, or simple planetary gearsets.

Figure 1:
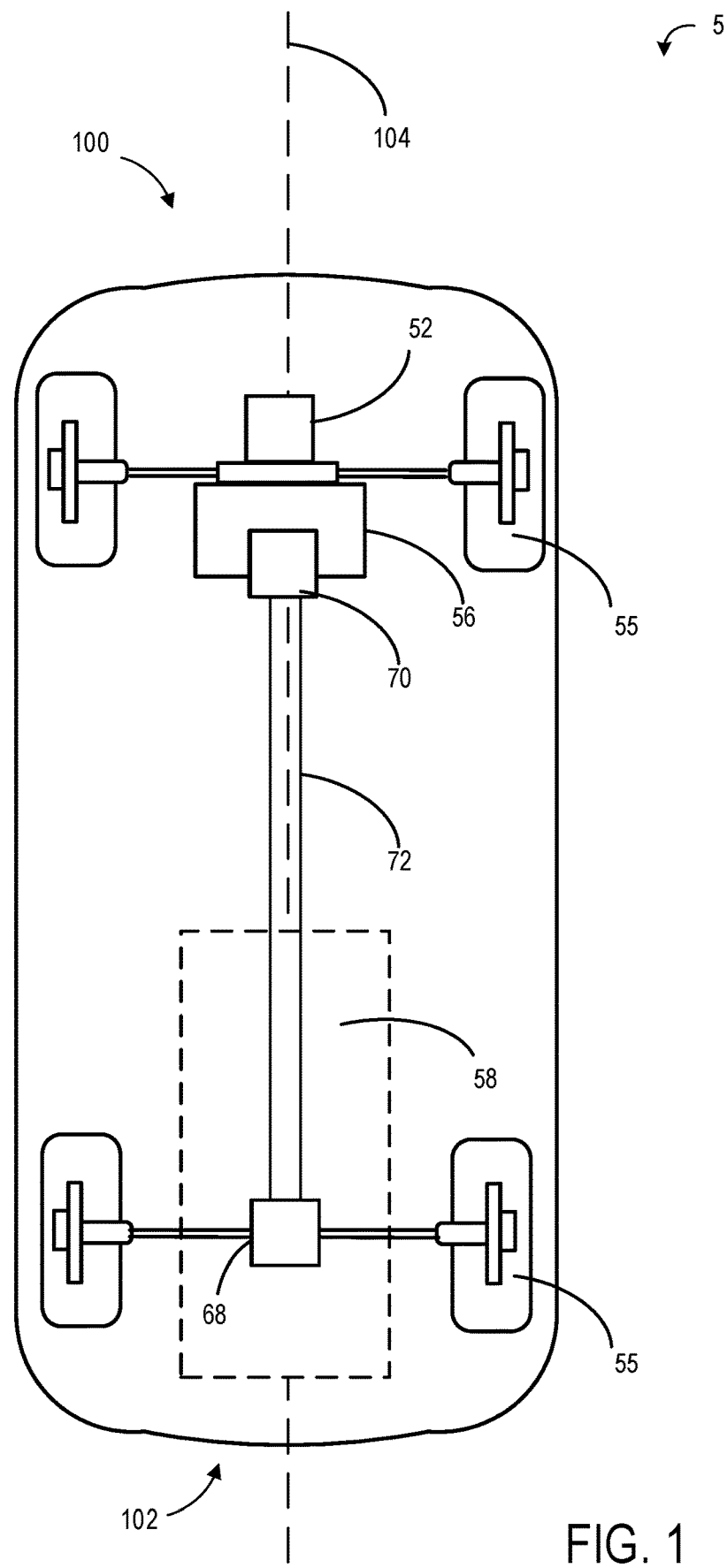
FIG. 1 shows an example schematic of a vehicle.
Figure 2:
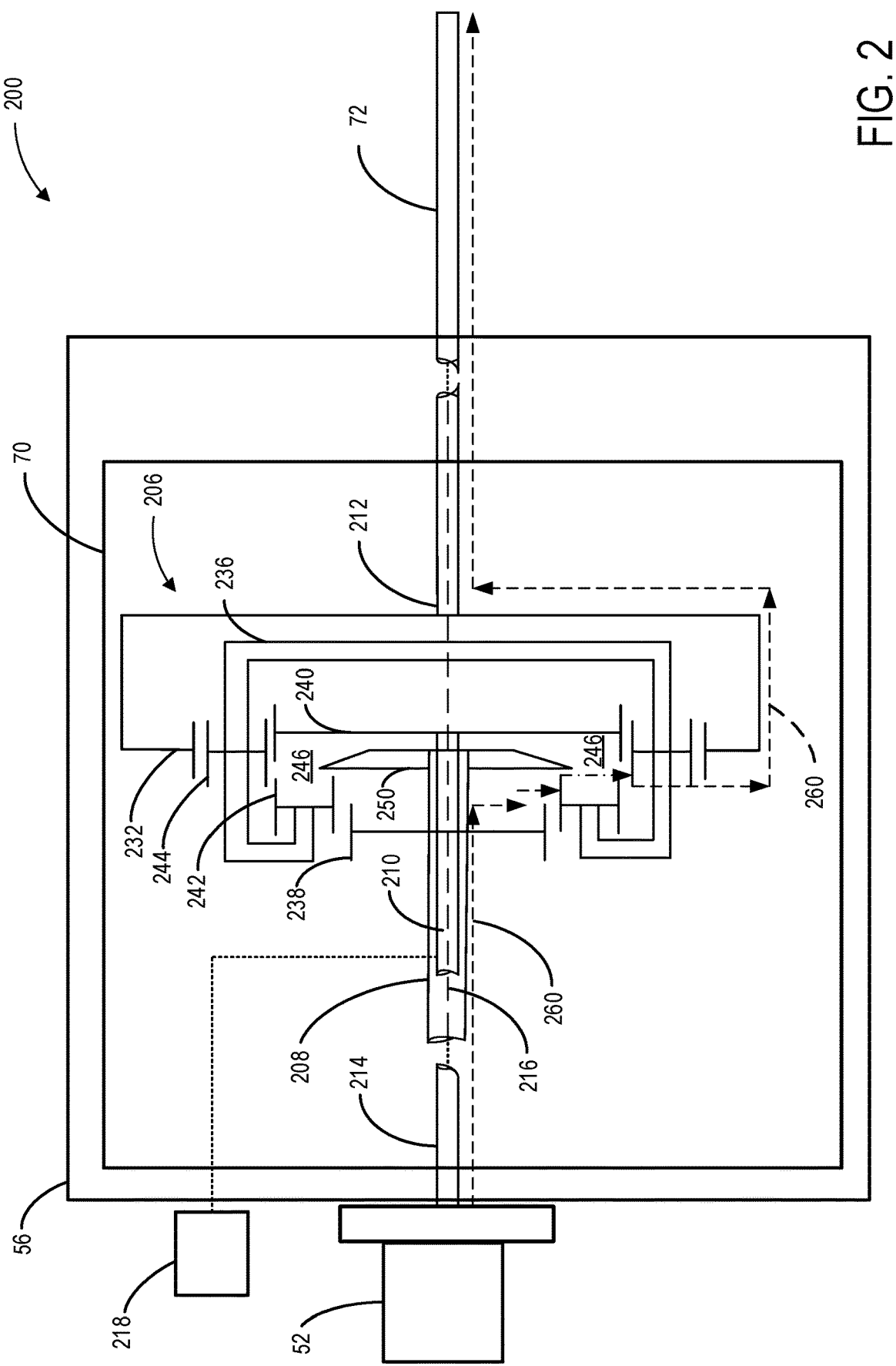
FIG. 2 shows an example schematic of components of a Raveneaux gearset, also spelled as a Ravigneaux gearset, and a disk to direct fluid.
Figure 3:
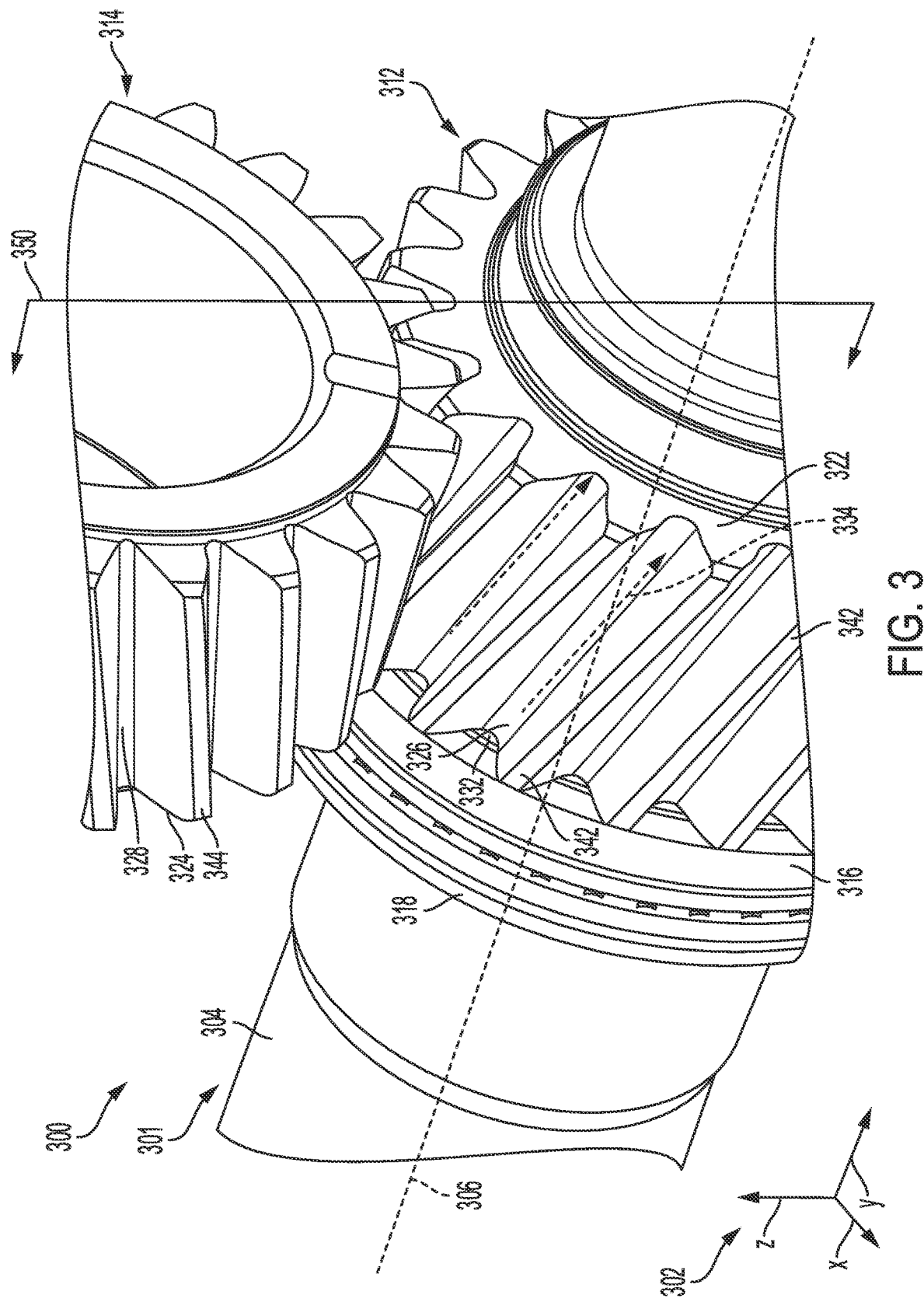
FIG. 3 shows a perspective view of an embodiment of inner member gears of a Raveneaux gearset including a ring to direct fluid.
Figure 4:
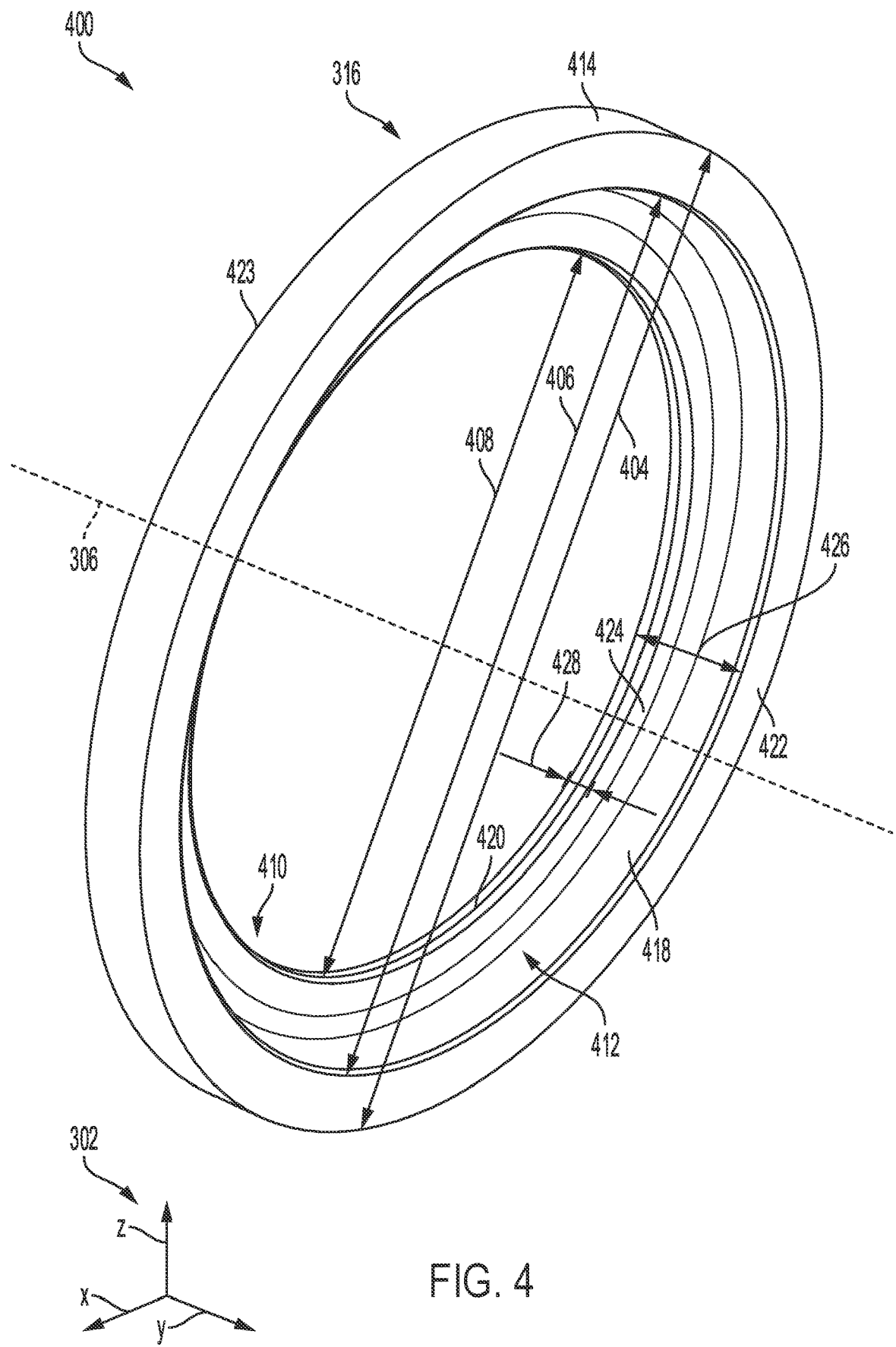
FIG. 4 shows a perspective view of an embodiment of a ring to direct fluid within a Raveneaux gearset, with the ring isolated from other components.
Figure 5A:
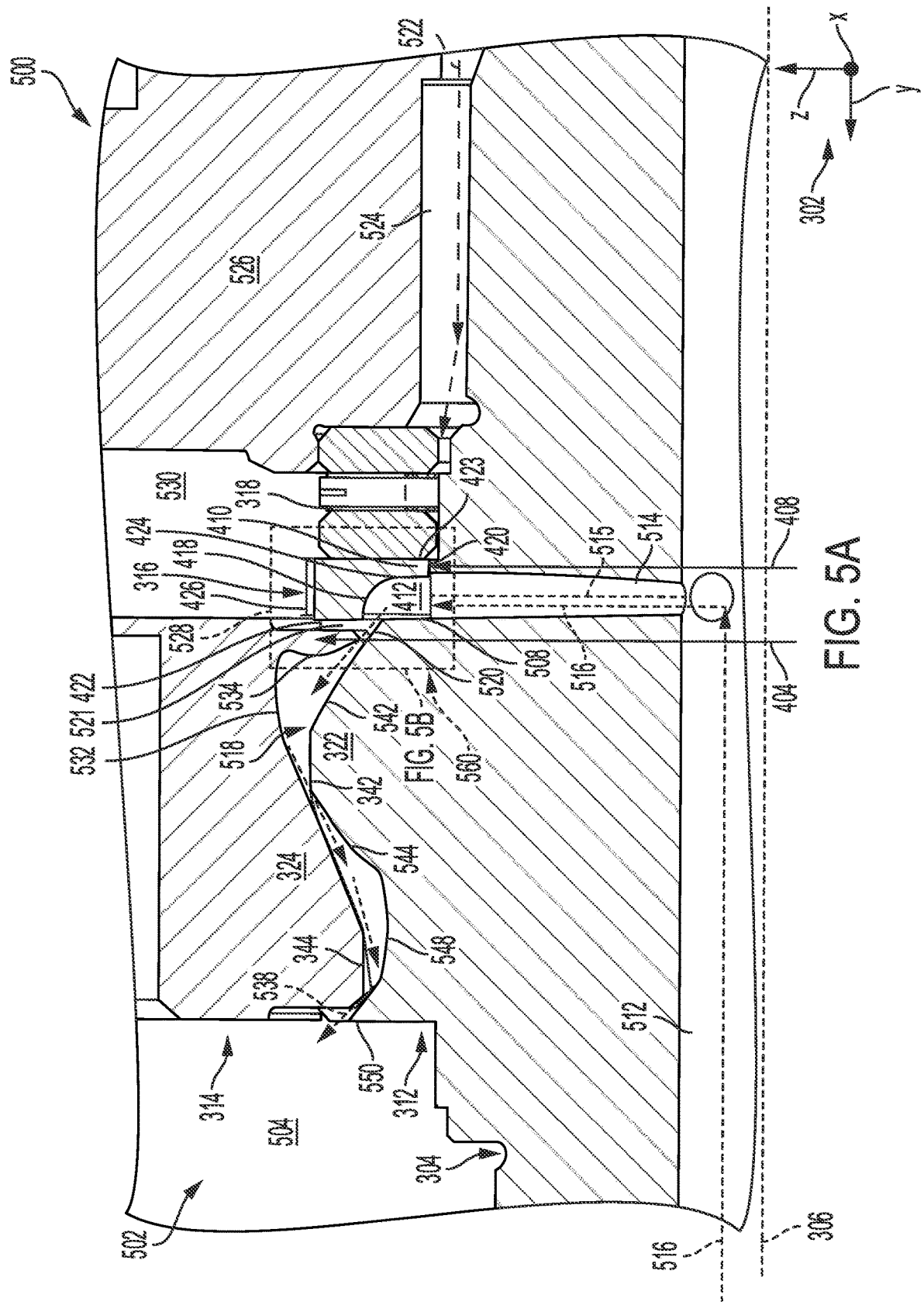
FIG. 5A shows a cross-section of an embodiment of an assembly including the ring, sun shaft, and inner member gears of FIG. 3.
Figure 5B:
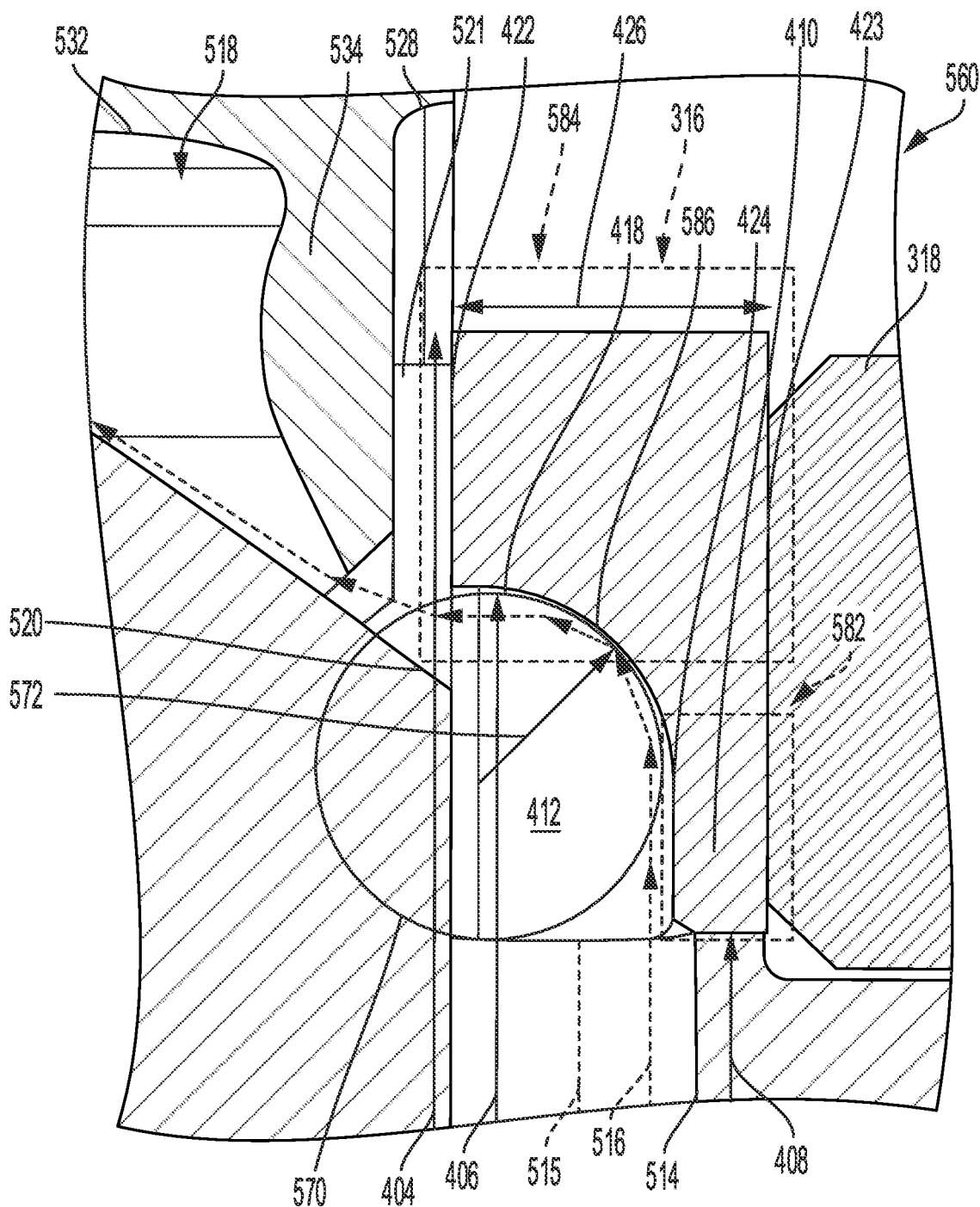
FIG. 5B shows a region of the cross-section of FIG. 5A and additional detail of the ring.
Figure 6:
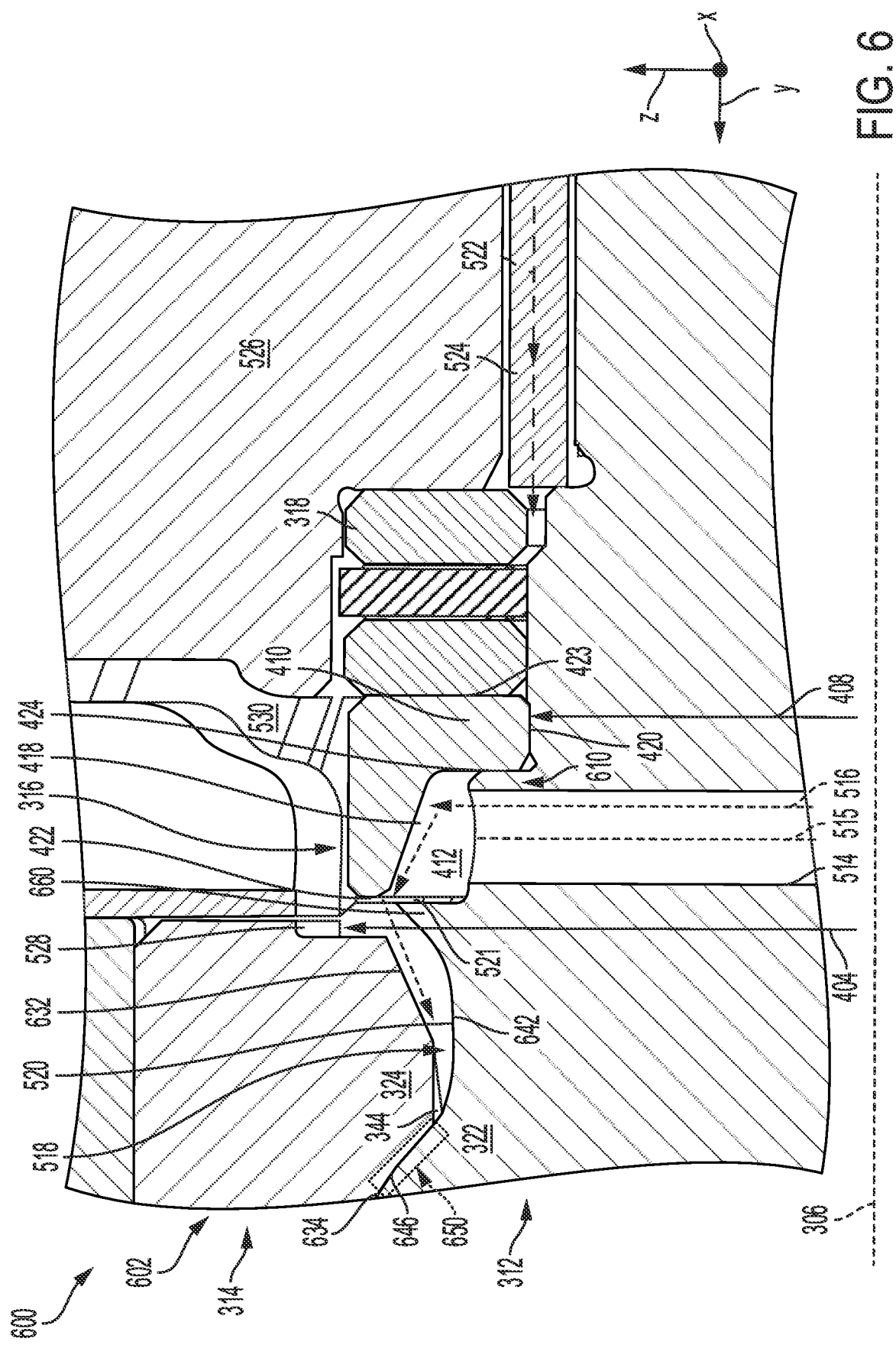
FIG. 6 shows a cross-section of another embodiment of an assembly including the ring, sun shaft, and inner member gears of FIG. 3.

A schematic of a vehicle of the present disclosure is depicted in FIG. 1. The vehicle may comprise a transmission that may comprise a gear box. The gear box may comprise a Raveneaux gearset. The Raveneaux gearset may comprise a shaft and a ring. A schematic of a Raveneaux gearset and a director ring within a transmission and a gear box of the present disclosure are shown in FIG. 2. FIG. 2 also shows a schematic of the components of the Raveneaux gearset. FIG. 3 shows a perspective view of a gear shaft assembly of the present disclosure that may be a part of the Raveneaux gearset. Some components of the assembly in FIG. 3 may form the inner member of the Raveneaux gearset. An perspective view of an embodiment of the ring and the ring isolated from the gear shaft assembly are shown in FIG. 4. Cross-sections of a first and second embodiment of gear shaft assemblies are shown in FIGS. 5A-B and FIG. 6, respectively. FIGS. 5A-B and FIG. 6 also depict the flow paths lubricant may take to lubricate gears and other components within the gear shaft assemblies. FIG. 5B shows region of the cross-section of FIG. 5B and additional features of the ring, such the axial and radial extending portions and elements of the curvature.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIGS. 1-2 show schematics of example configurations with relative positioning of the various components. FIGS. 3-6 show example configurations with approximate position. FIGS. 3-6 are shown approximately to scale, although other relative dimensions may be used. As used herein, the terms "approximately" is construed to mean plus or minus five percent of the range unless otherwise specified.

Further, FIGS. 3-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example.

As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Turning to FIG. 1, an example embodiment of a vehicle 5 is shown. The vehicle 5 may have a front end 100 and a rear end 102, and may be bisected into two approximately symmetrical halves by a longitudinal axis 104.

In some examples, vehicle 5 may be a hybrid vehicle with multiple sources of torque available to one or more vehicle wheels 55. Alternatively, the vehicle 5 may include solely an internal combustion engine. In other examples, vehicle 5 may be an all-electric vehicle, powered exclusively by an energy storage device such as a battery 58.

In the example shown, vehicle 5 includes a prime mover 52. In one example the prime mover 52 may be an engine, such as an internal combustion engine. For this example, the prime mover 52 may receive a fuel such as gasoline or diesel to combust, converting chemical energy from the fuel into rotational energy.

In other examples the prime mover 52 may be an electric machine which may be an electric motor, an electric motor/generator, or an electric motor/engine. The prime mover 52 may receive electrical power from the battery 58 which is converted to rotational energy, e.g., torque, at a transmission 56. The torque may be delivered to vehicle wheels 55, which includes a set of front wheels proximate to a front end 100 of vehicle 5 and a set of rear wheels proximate to a rear end 102 of vehicle 5. Prime mover 52 may also be operated as a generator to provide electrical power to charge the battery 58, for example, during a braking operation.

The prime mover 52 shown by FIG. 1 may provide rotational energy to the wheels of vehicle 5 via the transmission 56. For this example, the embodiment of vehicle 5 has the prime mover 52 and the transmission 56 closest to the front end 100 of vehicle 5. A gear box 70 is incorporated into the transmission providing the transmission with different gears to select via a clutch. For this example, the prime mover 52 and transmission 56 may provide rotational energy to a drive shaft 72 to transfer rotational energy to a differential 68 to rotate the wheels 55 closest to the rear end 102. It will be appreciated that in other examples, rotational energy may be alternatively provided to the wheels 55 located near the front end 100 of vehicle 5. Furthermore, in other examples, each of the wheels 55 near the front end 100 and the wheels 55 near the rear end 102 may be coupled to individual transmissions, such as when vehicle 5 is configured with all-wheel drive. As well, in other embodiments, transmission 56 and/or prime mover 52 may be arranged closer to the rear end 102 of vehicle 5 rather than the front end 100.

The battery 58 may be between the vehicle wheels 55 and closer to the rear end 102 of vehicle 5 than the front end 100. For example, the battery 58 may be positioned below rear passenger seats of the vehicle. In another example, the battery 58 may be located in a floor of a rear compartment of the vehicle or may be integrated into a vehicle chassis. In other examples, however, the battery 58 may be located in a different relative position within vehicle 5 than shown in FIG. 1.

Turning to FIG. 2 a schematic 200 of the transmission 56 and gear box 70 are shown containing a Raveneaux gearset 206. The Raveneaux gearset 206 is a system of gears that may circumferentially surround and drivingly couple a first sun shaft 208, a second sun shaft 210, and an output shaft 212. The first sun shaft 208 may drivingly couple a first shaft, and the output shaft 212 may drivingly couple a second shaft. The second sun shaft 210 may be circumferentially surrounded by the first sun shaft 208. The second sun shaft 210 may drivingly couple to the output of a secondary mover 218, such as an electric machine. The secondary mover 218 may supply a counter torque to the second sun shaft 210. The Raveneaux gearset 206 may have an output shaft 212. The output shaft 212 may be coupled to a second shaft.

The first and second sun shafts 208, 210 may be centered on a central axis 216, wherein the first and second sun shafts 208, 210 may circumferentially surround the central axis 216. The first and second sun shafts 208, 210 may be collinear or parallel with central axis 216. The first and second shafts may be collinear or parallel with the central axis 216.

For one example, the first shaft may be an output shaft 214 of the prime mover 52. For this example, the second shaft may be the drive shaft 72. The output shaft 214 may be referred to herein as the prime mover output shaft 214. However, other configurations of the gear box 70 are possible.

It is to be appreciated, that the first shaft may not be the output shaft 214 of the prime mover 52. In another example, the first shaft may be coupled to a gear of an output shaft of a prime mover. In another example, the first shaft may be an output shaft of a first gear. For this example, the first gear may be drivingly coupled to another gear or a plurality of gears. For this example, the other gear or plurality of gears may be part of another gearset drivingly coupled to a shaft, such as the output shaft 214 of the prime mover 52.

Additionally, it is to be appreciated, that the second shaft may not be the drive shaft 72. In another example, the second shaft may be another shaft besides the drive shaft 72. For this example, the other shaft may be drivingly coupled to a gear of a drive shaft 72. In another example, the second shaft may be the input to a gear. For this example, the gear may be drivingly coupled to another gear or a plurality of gears. For this example, the other gear or plurality of gears may be part of a gearset drivingly coupled to a shaft, such as drive shaft 72.

For example, the central axis 216 may be longitudinal with respect to and act as a longitudinal axis for the Raveneaux gearset 206, gear box 70, and transmission 56.

The Raveneaux gearset 206 may be formed by a ring gear 232, a planetary carrier 236, a first sun gear 238, and a second sun gear 240. The ring gear 232 may circumferentially surround the planetary carrier 236 and may drivingly couple to the gears of the planetary carrier 236 and the output shaft 212. The planetary carrier 236 may circumferentially surround and be drivingly coupled to the first and second sun gears 238, 240. The first sun gear 238 may be drivingly coupled to the first sun shaft 208. The second sun gear 240 may be drivingly coupled to the second sun shaft 210. The planetary carrier 236 may house a plurality of first planet gears 242 and a plurality of second planet gears 244. The first and second planet gears 242, 244 may be nested together as to have intermeshed teeth.

The first sun gear 238 may be drivingly coupled to and have gear teeth meshed with a plurality of first planet gears 242. The first sun gear 238 and first planet gears 242 may be referred to collectively as the inner members of the Raveneaux gearset 206. The second sun gear 240 may be drivingly coupled to and have gear teeth meshed with a plurality of second planet gears 244. The first and second planet gears 242, 244 may drivingly couple one another via intermeshed teeth, and the second planet gears 244 may drivingly couple and intermesh with the ring gear 232. The second planet gears 244, second sun gear 240, and ring gear 232 may be referred to collectively as the outer members of the Raveneaux gearset 206.

Between the inner and outer members of the Raveneaux gearset 206 with respect to the central axis 216 is a cavity 246. Within the cavity 246 and between the first and second sun gears 238, 240, with respect to the central axis 216, may be a ring 250. The ring 250 may be referred to herein as a director ring 250. The ring 250 may be positioned around the central axis 216 of the first and second sun shafts 208, 210. For example, the ring 250 may circumferentially surround and be coupled to the first sun shaft 208. The ring 250 may direct lubricant from the first sun shaft 208 towards spaces between the first sun gear 238 and first planet gears 242 mesh.

An example of a power flow 260 is shown by arrows. The power flow 260 represents a transfer of mechanical energy in the form of torque from the prime mover output shaft 214 to the first sun shaft 208. The torque from the prime mover output shaft 214 may cause the first sun shaft 208 and first sun gear 238 to spin about the central axis 216. The power flow 260 may continue and the spinning of the first sun gear 238 may transfer mechanical energy in the form of torque from the first sun shaft 208 to the first planet gears 242. For this example, the planetary carrier 236 may be unlocked and spin about the central axis 216. For this example, the second sun shaft 210 and second sun gear 240 may be locked preventing spinning about the central axis 216. The spinning or rotation of the first planet gears 242 may transfer mechanical energy to the second planet gears 244. The rotation of the second planet gears 244 may transfer mechanical energy into the ring gear 232. The ring gear 232 may be forced to rotate and spin about the central axis 216 in the same direction as the first sun shaft 208 and first sun gear 238. The output shaft 212 may rotate with the ring gear 232 about the central axis. The rotation of the ring gear 232 may transfer mechanical energy into output shaft 212 via torque. For this example, the output shaft 212 may transfer mechanical energy via torque to the drive shaft 72. For other examples the output shaft 212 may transfer mechanical energy via torque to another second shaft. As mechanical energy is transferred between the gears, the speed of rotation, e.g., rotation per minute (RPM), may be slowed and the torque may increase. The power flow 260 may end by transferring mechanical energy of an increased torque from the ring gear 232 and output shaft 212 into the drive shaft 72.

For other examples of a power flow, the second sun shaft 210 and the second sun gear 240 may not be stationary. For example, the planetary carrier 236 may be locked in place allowing the second sun shaft 210 and second sun gear 240 to rotate. For this example, the second sun shaft 210 and second sun gear 240 may spin about the central axis 216 in the direction of the second planet gears 244. For this example, torque may still be transferred to ring gear 232 to rotate the output shaft 212. For another example, the planetary carrier 236 may not be locked, but a counter torque may be supplied to the second sun shaft 210 and second sun gear 240. For this example, the second sun shaft 210 and second sun gear 240 may spin about the central axis 216 in the direction opposite to the second planet gears 244. For this example, the second sun shaft 210 and second sun gear 240 may stop the rotation for the ring gear 232 for when the vehicle 5 is in an idle state.

A set of reference axes 302 are provided for comparison between views shown in FIG. 3-6. The reference axes 302 indicate a y-axis, an x-axis, and a z-axis. In one example, the z-axis may be parallel with a direction of gravity and the x-y plane may be parallel with a horizontal plane that a gear shaft assembly 301 may rest upon. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

Turning to FIG. 3, a perspective view 300 of a gear shaft assembly 301 is shown. The gear shaft assembly 301 may act as a part of a larger gearset system, such as Raveneaux gearset 206 described above with reference to FIG. 2. The gear shaft assembly 301 includes a sun shaft 304 centered along a central axis 306. The central axis 306 may be the central axis 216, and the sun shaft 304 may be the same as or similar to the first sun shaft 208.

In the example shown by FIG. 3, the central axis 306 is longitudinal with respect to (and may act as a longitudinal axis for) the gear shaft assembly 301. Features described as longitudinal may be approximately parallel to a longitudinal axis. For this example, the longitudinal features may be approximately parallel with the central axis 306 and y-axis.

The central axis 306 may be approximately parallel to the length of the sun shaft 304. The gear shaft assembly 301 also includes a sun gear 312, a ring 316, and a bearing 318 that may be positioned around the sun shaft 304.

The sun gear 312, the ring 316, and the bearing 318 may circumferentially surround the sun shaft 304. The sun gear 312 may be one of the one or more gears positioned circumferentially around the sun shaft 304. The bearing 318 may be a ring like structure. The bearing 318 may contain spheres or cylinders with smooth surfaces that may rotate about the central axis 306 or spin about axes parallel with the central axis 306. The bearing 318 may mechanically support and allow the sun shaft 304 and sun gear 312 to spin about the central axis 306. The ring 316 may be the same or similar to the ring 250. The ring 316 may be located between the sun gear 312 and the bearing 318 with respect to the central axis 306 (e.g., between the sun gear 312 and the bearing 318 in the direction parallel with the central axis 306, which may be referred to herein as the axial direction). For the example shown in FIG. 3, the sun gear 312 may be located in a positive direction, with respect to the y-axis, relative to the ring 316 along the central axis 306. For this example, the bearing 318 may be located in a negative direction, with respect to the y-axis, relative to the ring 316 along the central axis 306.

The sun gear 312 may drivingly couple with a planet gear 314. There may be a plurality of planet gears that are the same or similar to planet gear 314. For example, each of the planet gears may have a same size, shape, weight, etc. The planet gear 314 may be one of the one or more gears positioned around the sun shaft 304. The sun gear 312 may be the same or similar to the first sun gear 238. The planet gear 314 may be the same or similar to one of the first planet gears 242. The sun gear 312 and planet gear 314 may be referred to collectively as inner members of the gearset.

The sun gear 312 and the planet gear 314 may each have a plurality of teeth in the form of a plurality of sun gear teeth 322 and planet gear teeth 324, respectively. The sun gear 312 and planet gear 314 may mesh, wherein the sun gear teeth 322 may mesh with the planet gear teeth 324. The sun gear 312 may rotate in an opposite direction of the planet gear 314. Between the sun gear teeth 322 and planet gear teeth 324 are a plurality of first bottom lands 326 and second bottom lands 328, respectively. On each of the sun gear teeth 322 and planet gear teeth 324 is a first top land 342 and second top land 344, respectively. The first and second top lands 342, 344, are positioned at a radial distance from the center of respective gears. Likewise, the first and second bottom lands 326, 328, are positioned at a radial distance from the center of respective gears. The radial distance of the top lands may be greater than the radial distance of the respective bottom lands.

In some embodiments the sun gear teeth 322 and planet gear teeth 324 may be helical teeth, such as in embodiment shown by FIG. 3. In other embodiments, however, the sun gear teeth 322 and/or the planet gear teeth 324 may have a different shape. For example, in some embodiments, the sun gear teeth 322 and planet gear teeth 324 may be straight. In some embodiments, the sun gear teeth 322 and planet gear teeth 324 may be another shape providing the meshing of the sun gear 312 and the planet gear 314, such as an involute shape, cycloid shape, or trochoid shape.

The sun gear teeth 322 and first bottom lands 326 may form a plurality of passages 332 which receive lubricant from the ring 316. Lubricant may flow along a plurality of paths 334, parallel with the length of the passages 332, to lubricate and remove or dissipate heat from the sun gear 312 and planet gear 314.

FIG. 4 shows a perspective view 400 of the ring 316 with reference to FIG. 3 isolated from the gear shaft assembly 301. As in FIG. 3, the ring 316 circumferentially surrounds the central axis 306. The ring 316 has an outer diameter 404, a first inner diameter (ID1) 406, and a second inner diameter (ID2) 408. For one example, an inner ring 410 and a curved surface 412 may be formed from an embodiment of the ring 316.

For this example, the curved surface 412 may be a cut formed via machining, and may be referred to as a cutout. However, the formation of curved surface 412 may be non-limiting. For other examples, the curved surface 412 may be formed via casting or shaping.

The curved surface 412 may be formed by and join a first inner surface 418 and a second lateral surface 424 of the inner ring 410. For this embodiment the inner ring 410 and curved surface 412 extend 360 degrees and circumferentially surround the central axis 306. The inner ring 410 may abut the sun shaft 304 and/or the sun gear 312. However, it is to be appreciated that the dimensions of the curved surface 412 may be non-limiting. For other embodiments the curved surface 412 or a plurality of curved surfaces may only cover and extend above the holes. These regions may be areas on portions of the sun shaft 304 and/or sun gear 312 where holes are located. For these embodiments, there may be other areas of the ring 316 that abut the sun shaft 304 or sun gear 312 similar to the inner ring 410. The ring 316 may have a first thickness 426 approximately parallel with the central axis 306 and may be longitudinal. The first thickness 426 is a maximum, wherein the thickness of the ring 316 may be the greatest, at the outer perimeter of the ring 316.

The outer diameter 404 extends between opposite sides of the outer surface 414 of the ring 316 (e.g., between opposing ends of the ring 316, across the central axis 306 and in the direction radial to central axis 306). The ID1 406 extends between opposite sides of the first inner surface 418 of the curved surface 412. ID1 406 may decrease in distance as the first inner surface 418 approaches the inner ring 410 along the central axis 306. The ID2 408 extends between opposite sides of a second inner surface 420 of the inner ring 410. The ID2 408 may form the inner diameter of the inner ring 410. The first inner surface 418 may extend between a second lateral surface 424 formed on the inner ring 410 and a first lateral surface 422. The second inner surface 420 extends with a second thickness 428 of the inner ring 410. The second thickness 428 is a minimum, wherein the thickness of the ring 316 may be the least. For an example of an embodiment, the first inner surface 418 may be curved about and circumferentially surround the central axis 306. For this example, the second inner surface 420 may also be curved about and circumferentially surround the central axis 306. For example, the second thickness 428 is approximately parallel with the central axis 306 and may be longitudinal. However, it is to be appreciated that the shape of the inner surfaces may be non-limiting. For other examples, other embodiments of ring 316 may have a first and/or second inner surface 418, 420 that are not curved.

The second inner surface 420 may extend axially with respect to the central axis 306. The second inner surface 420 may abut and circumferentially surround the shaft 304 and/or portions of the sun gear 312. Likewise, the first inner surface 418 may extend axially with respect to the central axis 306. The first and second inner surfaces 418, 420 for this example may extend longitudinally, with respect to the central axis 306.

The ring 316 has a first lateral surface 422 located between the outer surface 414 and curved surface 412 and a second lateral surface 424 located on the inner ring 410. There may be a third lateral surface 423 located on the opposite side of the ring 316 from the first lateral surface 422 with respect to the central axis 306. For the embodiment of ring 316 shown in perspective view 400, the first, second, and third lateral surfaces 422, 424, 423 may be approximately flat and formed on planes approximately parallel with planes formed on the x and z axes. Additionally, the first, second, and third lateral surfaces 422, 424, 423 are approximately perpendicular to the central axis 306. The first, second, and third lateral surfaces 422, 424, 423 may extend radially with respect to the central axis 306. In other embodiments, the first, second, and third lateral surfaces 422, 424, 423 may have curvature or may be oriented at an angle to central axis 306.

The ring 316 may comprise a radially extending portion and an axially extending portion, which are depicted in FIG. 5B. The axially extending portion of the ring 316 may comprise the first inner surface 418 and the outer surface 414 which extend axially with respect to the central axis 306. The radially extending portion of the ring 316 may comprise the inner ring 410 and the second lateral surface 424 which extend radially relative to the shaft 304. The second lateral surface 424 is joined to the first inner surface 418 and extends inward from the first inner surface 418 toward the central axis 306. The second lateral surface 424 may terminate where the second inner surface 420 forms. The first inner surface 418 may extend from the first lateral surface 422 toward the first lateral surface 422. The outer surface 414 extend axially with the central axis 306 from the third lateral surface 423. The outer surface 414 extends toward and terminates at the first lateral surface 422.

FIG. 5A shows a cross-sectional view 500 of a first gear shaft assembly 502. The first gear shaft assembly 502 may act as a system of gears and shafts wherein components may be drivingly coupled. The first gear shaft assembly 502 may be an embodiment that is the same or similar to the gear shaft assembly 301. The first gear shaft assembly 502 may have the same or similar components as gear shaft assembly 301. The first gear shaft assembly 502 may include a sun shaft 304 centered on a central axis 306. The sun shaft 304 may support and be surrounded by a sun gear 312, a ring 316, and a bearing 318. Additionally, there may be planet gear 314 located above the sun shaft 304, with respect to the z-axis (e.g., above the central axis 306). The sun gear 312 may be meshed with the planet gear 314. Elements of the gear shaft assembly 301 described with respect to FIGS. 3 and 4 which are included in FIG. 5A are equivalently numbered and may not be reintroduced, for brevity. The first cross-section 500 may be taken on a plane parallel to a plane formed on the z and y-axes. The cross-section 500 may be taken on a plane formed between the central axis 306 and line 350 shown by FIG. 3. Alternatively, the first cross-section 500 may be taken on a plane parallel with a plane formed on the z and y-axes, on which the central axis 306 is approximately coplanar.

The first gear shaft assembly 502 may have an exterior 504. The exterior 504 may be a space that may be part of or surrounding the first gear shaft assembly 502 and is outside a Raveneaux gearset, such as Raveneaux gearset 206. The exterior 504 may be located outside of the sun gear 312 and planet gears 314; additionally, the exterior may not be located between sun gear 312 and a gear 526, or another gear part of a Raveneaux gearset, with respect to the central axis 306. The gear 526 may be a second planet gear or a second sun gear. For the example in FIG. 5A, the exterior is located in the positive direction with respect to the y-axis from the sun gear 312 and planet gear 314. A similar space outside of a Raveneaux gearset may also be located in the negative direction with respect to the y-axis from the gear 526.

The ring 316 and bearing 318 may be located between sun gear 312 and/or planet gear 314 and the gear 526. For example, in an embodiment of the first gear shaft assembly 502 the ring 316 may be closer to the sun gear 312 and/or planet gear 314. For this example, the bearing 318 may be closer to the gear 526. The sun gear 312 may be a first gear of one or more gears, and the gear 526 may be a second gear of another one or more gears.

The second inner surface 420 of the ring 316 may abut and circumferentially surround portions of the sun gear 312 and/or shaft 304. The first lateral surface 422 may abut a first surface 508 of the sun gear 312. The first surface 508 may be lateral with respect to the central axis 306. For example, the first surface 508 may be parallel with a plane of the x and z axes. For the example in FIG. 5A, the first surface 508, the sun gear 312, and planet gear 314 may be located positive to the ring 316 with respect to the y-axis. For this example, the bearing 318 may be located negative to the ring 316 with respect the y-axis. For another example, the first surface 508, the sun gear 312, and planet gear 314 may be located negative to the ring 316 with respect to the y-axis. For this example, the bearing 318 may be located positive to the ring 316 with respect the y-axis. For other examples, the central axis 306 may not be aligned (e.g., not parallel with) the y-axis. For other examples, the central axis 306 may not be aligned (e.g., not parallel with) the x or z axes. For one of these examples, the first surface 508, the sun gear 312, and planet gear 314 may be located in a first direction from the ring 316, wherein the first direction is parallel with the central axis 306. For this example, the bearing 318 may be located in a second direction opposite to the first direction, with respect the central axis 306, from the ring 316. For another of these examples, the first surface 508, the sun gear 312, and planet gear 314 may be located in the second direction from the ring 316 with respect to the central axis 306. For this example, the bearing 318 may be located in the first direction opposite to the second direction to the ring 316 with respect the central axis 306.

The shaft 304 has a center bore 512 that may circumferentially surround the central axis 306. For one embodiment the center bore 512 may be drilled. However, it is to be appreciated that the formation of the center bore 512 may be non-limiting; for other embodiments the center may be formed via other methods, such as casting, molding, or shaping. The center bore 512 may act as a passageway for fluid and may fluidly couple one or more holes, such as a plurality of holes 514.

The one or more holes on the shaft, such as holes 514, may be oriented radially with respect to the central axis. The holes 514 may be located within and extend through the material of the sun shaft 304 and/or sun gear 312. For the example in FIG. 5A, the holes 514 may be oriented within and extend radially outward from the center bore 512 to the circumference of a portion of the shaft 304 and/or sun gear 312. Each of the holes 514 may have an axis 515. The axes 515 may be circumferentially surrounded by and may act as central axes for the holes 514. The holes 514 may be surrounded by the curved surface 412. Lubricant or other fluid may follow a first path 516 along the center bore 512, through the holes 514 and into curved surface 412. The curved surface 412 may guide lubricant along the path 516 toward the surface 508 and into a plurality of spaces 518.

Each of the spaces 518 may be formed between each of the sun gear teeth 322 and planet gear teeth 324. The spaces 518 form a plurality of passages lubricant or other fluid may flow through. There may be a plurality of spaces 518 formed between the sun gear teeth 322 and planet gear teeth 324.

Lubricant or another fluid traveling through the holes 514 along path 516 may change direction from traveling radially from the central axis 306 to traveling parallel with the central axis 306 in region 560. The curved surface 412 may change the direction of lubricant on path 516.

Turning briefly to FIG. 5B, it shows a closer view and additional features of the curved surface 412. FIG. 5B may be taken on region 560. Region 560 shows the ring 316 may have a portion 582 that extends radially relative to the shaft. Additionally, region 560 shows a portion 584 that extends axially, with respect to the central axis 306. The portion 582 may be referred to herein as a radially extending portion 582, and the portion 584 may be referred to herein as an axially extending portion 584. Features such as first thickness 426, the first lateral surface 422, the first inner surface 418, the outer surface 414, and portions of the curved surface 412 may form the axially extending portion 584. Features such as the second thickness 428, the second lateral surface 424, the inner ring 410, and portions of the curved surface 412 may form the radially extending portion 582. The radially extending portion 582 and axially extending portion 584 may enclose and form the curved surface 412.

Region 560 also shows the curved surface 412 may have a radius 572. A portion 586 of the curved surface 412 may have a curvature formed approximately to the circumference of a circle 570. The portion 586 of the curved surface 412 is rounded and may be approximately a partial circle in shape. Portion 586 may be referred to herein as a curved portion 586.

The axially extending portion 584 may extend longitudinally. The axially extending portion 584 of the ring 316 may extend toward gears, such as the sun gear 312 and the planet gear 314. The axially extending portion of the ring 316 may overlap and intersect a plurality of axes 515 of the holes 514. The axially extending portion 584 may prevent fluid from moving parallel with the axes 515 past the first inner surface 418. The radially extending portion 582 of the ring 316 may be approximately parallel with the axes 515 of the holes 514. The curved surface 412 may join surfaces of the radially extending portion 582 to the surfaces of the axially extending portion 584 via the curved portion 586. The curved portion 586 may join the first inner surface 418 to the second lateral surface 424. The curved portion 586 may extend in a radial direction from the second lateral surface 424 and curve in an axial direction to join with the first inner surface 418.

Lubricant or other fluid flows through the holes 514 may be directed toward and into the curved surface 412. The radius 572 and curved portion 586 of curved surface 412 may guide fluid from moving in a radial direction to a direction parallel with the central axis 306. For example, when a fluid exits the holes 514 along path 516, the fluid may travel approximately parallel with radially extending portion 582. The second lateral surface 424 guides fluid into the curved surface 412. The curved surface 412 changes the direction of the fluid and path 516, as the second lateral surface 424 forms joins to the curved portion 586. Path 516 may curve toward the curved portion 586 of the curved surface 412. As the path 516 continues, the curved portion 586 prevents lubricant or other fluid from moving radially. When enclosed by the curved portion 586, path 516 may curve in a direction that is increasingly axial, with respect to the central axis 306. The radius 572 and curved portion 586 may change the direction of a fluid while minimizing energy loss and pressure drop. As the curved portion 586 joins to the first inner surface 418, the fluid on path 516 may travel axially. The first inner surface 418 prevents fluid from moving radially. As the fluid on path 516 travels axially, the fluid may travel toward the first surface 508 and first gear roots 520 of the sun gear 312. The fluid may exit the volume enclosed by the curved surface 412 near the first lateral surface 422.

Returning to FIG. 5A, cross-section 500 shows a passage 524 may be formed between the gear 526 and the shaft 304 and/or the sun gear 312. Lubricant may be delivered as a lubricant flow along a second path 522 to the bearing 318 via the passage 524. Lubricant may be delivered along the first path 516 and second path 522 may dissipate heat and reduce friction between the sun gear 312 and planet gear 314 and between the bearing 318 and sun gear 312 and/or shaft 304, respectively. Circumferentially surrounding the ring 316 and bearing 318 is a cavity 530. Cavity 530 may be the same or similar to cavity 246.

To enter the space 518, lubricant may be forced to flow along the first path 516 into and over a first gear root 520 of the sun gear 312 by the ring 316. There may be a plurality of first gear roots 520, with a first gear root 520 between each of the sun gear teeth 322. There may be a plurality of second gear roots 528, with a second gear root 528 between each of the planet gear teeth 324. The first gear roots 520 may form into and/or be a part of the first bottom lands 326. The second gear roots 528 may form into and/or be a part of the second bottom land 328. The volume of a space 518 may be formed between the first gear roots 520 and the second gear roots 528. There may be a plurality of spaces 518 formed between the first gear roots 520 of the sun gear teeth 322 and the second gear roots 528 of the planet gear teeth 324.

The first cross-section 500 shows additional features that may be included by the sun gear teeth 322 and planet gear teeth 324, in some embodiments. For example, the planet gear teeth 324 may have a first curved surface 532. The first curved surface 532 may join to each of the second gear roots 528 and wall 534. The first curved surface 532 may curve downward, with respect to the z-axis (e.g., toward the central axis 306), from the wall 534 toward a second top land 344 of the planet gear teeth 324. The second top land 344 may join to a second curved surface 538. The second curved surface 538 may curve up, with respect to the z-axis (e.g., from the central axis 306), from the second top land 344 toward the second gear root 528 of the planet gear teeth.

For the cross-section 500, the sun gear teeth 322 may have a first curved surface 542. The first curved surface 542 may join the first gear root 520 and a first wall 521. The first curved surface 542 curves up, with respect to the z-axis, from the first gear root 520 toward the first top land 342 of the sun gear teeth 322. The first top land 342 may join to a second curved surface 544 that curves downward, with respect to the z-axis, from the first top land 342 toward the first gear root 520 of the sun gear teeth 322. The second curved surface 544 may join to a third curved surface 548. The third curved surface 548 curves up, with respect to the z-axis, from the first gear root 520 toward and join to second wall 550 of the sun gear teeth 322.

The lubricant may travel as a lubricant flow on the first path 516. At the start of the first path 516 lubricant flows approximately parallel with the central axis 306 and travel through the center bore 512. At the holes 514 the direction of the first path 516 changes and lubricant may travel perpendicular to the central axis 306 along first path 516 through holes 514 that extend radially toward the ring 316. The lubricant may also travel along similar paths through other holes that extend radial toward the ring 316. For one example, lubricant may flow in a vertical direction, with respect to the z-axis, along a hole of the holes 514. The second lateral surface 424 on the inner ring 410 may be parallel with the axes 515 of the holes 514 allowing the lubricant to flow vertically into the curved surface 412 of the ring 316. The first inner surface 418 extends away from the inner ring 410, curving toward the first lateral surface 422 and gradually becoming approximately parallel with the central axis 306. As the curved surface 412 receives lubricant, the curved surface 412 may direct the lubricant and first path 516 from a direction parallel with the axes 515 of the holes 514 to an axial direction parallel with the central axis 306. The first inner surface 418 may direct the lubricant and first path 516 in an axial direction parallel with the central axis 306 toward first surface 508 and first gear roots 520 of the sun gear 312. In this example, lubricant may be directed in a longitudinal direction toward the first gear roots 520 by the first inner surface 418. The inner ring 410, first inner surface 418, and curved surface 412 may collect and redirect lubricant leaving the first gear roots 520 and may prevent lubricant from leaking into the cavity 530. Lubricant collected by the curved surface 412 may be returned to first gear roots 520 and spaces 518 by lubricant following the first path 516.

For example, lubricant on the first path 516 may pass the first gear roots 520 and pass a first wall 521 to enter the spaces 518. For one example the spaces may 518 may have a first curved surface 532 on the planet gear teeth 324. The first curved surface 532 is smooth and curves away from the wall 534. The wall 534 of the planet gear 314 may prevent back flow of the lubricant toward the ring 316. The first curved surface 532 of the planet gear teeth 324 and a first curved surface 542 of sun gear teeth 322 may guide lubricant toward the first top land 342 of the sun gear teeth 322. The first curved surface 532 may extend past the first top land 342, guiding the lubricant along the first path 516 past the first top land 342. The first curved surface 532 of the planet gear teeth 324 and a second curved surface 544 of the sun gear teeth 322 may guide lubricant along the first path 516 toward the second top land 344 of the planet gear teeth 324. The third curved surface 548 of the sun gear teeth 322 and a second curved surface 538 of planet gear teeth 324 may guide lubricant along the first path 516 toward and past a second wall 550 of the sun gear teeth 322. The third curved surface 548 and second curved surface 538 may guide lubricant along the first path 516 between the first and second gear roots 520, 528, to exit the space 518. The lubricant may then exit to the exterior 504. Upon exiting the space 518, lubricant traveling along the first path 516 may have absorbed additional energy friction between the gears, dissipating heat.

It is to be appreciated the shape of spaces 518 may variable with the rotation of the sun gear 312 and planet gear 314 and be non-limiting. Additionally, it is to be appreciated that the features of the sun gear 312 and planet gear 314 that form and/or surround spaces 518 may be non-limiting. For other examples, in another embodiment the sun gear teeth 322 and planet gear teeth 324 may be straight. For other examples, in another embodiment the sun gear teeth 322 and planet gear teeth 324 may be another viable shape for meshing the sun gear 312 and planet gear 314. For another example, the sun gear teeth 322 and planet gear teeth 324 may be helical but of different dimensions. For these examples, the shape of spaces 518 may different compared to spaces 518 in embodiment of the first gear shaft assembly 502 in FIG. 5A-B.

Turning to FIG. 6, a cross-sectional view 600 of a gear shaft assembly 602 is shown. The second gear shaft assembly 602 may be an embodiment similar to the gear shaft assembly 301. Description of elements similar to gear shaft assembly 301 may not be repeated. Elements of the gear shaft assembly 301 described with respect to FIGS. 3 and 4 which are included in FIG. 6 are equivalently numbered and may not be reintroduced, for brevity. The cross-section 600 may be taken on plane formed between the central axis 306 and line 350 shown by FIG. 3. Alternatively, the second cross-section 600 may be taken on a plane parallel with a plane formed on the z and y-axes, on which the central axis 306 is approximately coplanar.

The second gear shaft assembly 602 has many of the same features as first gear shaft assembly 502. Elements of the first gear shaft assembly 502 described with respect to FIGS. 5A-B which are included in FIG. 6 are equivalently numbered and may not be reintroduced, for brevity. The second gear shaft assembly 602 may act as a system of gears and shafts wherein components may be drivingly coupled.

The second gear shaft assembly 602 has a shoulder 610. The shoulder 610 may extend radially from the shaft 304 and/or a portion of the sun gear 312 relative to the central axis 306. The shoulder 610 may extend radially with one or more of holes 514. The shoulder 610 may be located between one or more of holes 514 and the ring 316, with respect to the central axis 306. The shoulder 610 may abut the second lateral surface 424 coupling the ring 316 between the sun gear 312 and the bearing 318. The shoulder 610 may offer additional support to the ring 316. The shoulder 610 may prevent the ring 316 from sliding axially, with respect to the central axis 306. Additionally, the shoulder 610 may prevent the ring 316 from becoming dislodged from the shaft 304 without deliberate force and/or disassembly of the second gear shaft assembly 602. For an example of one embodiment, the shoulder 610 may extend radially from and 360 degrees about the shaft 304 and/or a portion of the sun gear 312 relative to the central axis 306.

The second cross-section 600 shows additional features of the sun gear teeth 322 and planet gear teeth 324. For one example the spaces 518 may have a third curved surface 632 on the planet gear teeth 324. The third curved surface 632 may curve downward, with respect to the z-axis, toward a second top land 344 of the planet gear teeth 324. The second top land 344 may join to a fourth curved surface 634. The fourth curved surface 634 may curve up, with respect to the z-axis, from the second top land 344. The sun gear teeth 322 may have a fourth curved surface 642 joined to the first wall 521. The fourth curved surface 642 may curve downward, with respect to the z-axis, from the first wall 521 toward the first gear roots 520. The fourth curved surface 642 may join to a fifth curved surface 646. The fifth curved surface 646 may curve upward, with respect to the z-axis, from the first gear root 520. There may be an interface 650 between the fourth curved surface 634 and fifth curved surface 646 where the sun gear teeth 322 and planet gear teeth 324 may super impose with respect to the central axis 306 and/or may touch.

For one example, lubricant may be delivered along the first path 516 and through the space 518, by first passing through and over the first gear roots 520 and/or over an incline 660 formed between the fourth curved surface 642 and first wall 521 of the sun gear teeth 322. For this example, lubricant may continue along the first path 516 through space 518 passing the third curved surface 632 and second top land 344 on planet gear teeth 324 and the fourth curved surface 642 on the sun gear teeth 322. Lubricant may continue along the first path 516 through space 518 passing the fourth curved surface 634 on planet gear teeth 324 and fifth curved surface 646 on the sun gear teeth 322. For another example, there may be contact between the sun gear teeth 322 and planet gear teeth 324 at the interface 650. For this example, lubricant may be squeezed out from the interface 650 to below the second top land 344. Lubricant may also be squeezed out from and above the interface 650, with respect to the z-axis. Lubricant above the interface 650 may travel further above the interface 650 along the fifth curved surface 646 and fourth curved surface 634. For this example, lubricant may exit the space 518 at some point after the fifth curved surface 646 and fourth curved surface 634. For this and other examples, there may be additional features of the planet gear teeth 324 and sun gear teeth 322 the lubricant may pass after the fifth and fourth curved surfaces 646, 634 before exiting the space 518.

Thus, disclosed herein are systems and components for a ring for directing lubricant in a gear shaft assembly part Raveneaux gearset. The ring may direct lubricant toward the face(s) of and between the teeth of one or more gears. The ring may direct lubricant from holes extending radially from a bore in a shaft. The ring may allow the Raveneaux gearset, and by extension gear box, to be more compact and less complex by removing lubricant sprayers. Additionally, the ring may increase the quantity of lubricant sent between the gears compared to gearsets that use holes in the shaft for lubricant delivery without the ring for lubrication. The ring therein may increase the rate of heat dissipation and that lubricant enters the space between gears.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The disclosure also provides support for a system comprising: a shaft comprising one or more lubricant holes oriented radially within the shaft, one or more gears positioned radially around a central axis of the shaft, a ring positioned circumferentially around the shaft and the ring shaped with a radially extending portion and an axially extending portion, the axially extending portion directing lubricant flow from the one or more lubricant holes in an axial direction towards the one or more gears. In a first example of the system, the axially extending portion of the ring overlaps an exit of the one or more lubricant holes. In a second example of the system, optionally including the first example, the radially extending portion of the ring extends in a direction of the central axis of the one or more lubricant holes and the axially extending portion of the ring extends from the radially extending portion of the ring to intersect the central axis of the one or more lubricant holes. In a third example of the system, optionally including one or both of the first and second examples, lubricant flows radially outward from the one or more lubricant holes, then flows along the radially extending portion of the ring, and then flows along the axially extending portion of the ring. In a fourth example of the system, optionally including one or more or each of the first through third examples, the axially extending portion of the ring extends in a direction of the one or more gears. In a fifth example of the system, optionally including one or more or each of the first through fourth examples, the shaft is a sun shaft of a Raveneaux gearset and the one or more gears are part of the Raveneaux gearset. In a sixth example of the system, optionally including one or more or each of the first through fifth examples, passages formed by teeth of the one or more gears receive lubricant flow from the ring and the ring receives lubricant flow from the one or more lubricant holes. The disclosure also provides support for a system comprising: a shaft comprising one or more holes oriented radially within the shaft, one or more gears positioned circumferentially around the shaft, a ring positioned circumferentially around the shaft and the ring shaped with a radially extending portion and an axially extending portion, the axially extending portion of the ring directing lubricant flow from the one or more holes to a surface of a first gear of the one or more gears. In a first example of the system, an axial surface of the ring is positioned in contact with an exterior of the shaft and a curved surface of the ring forms the axially extending portion of the ring and the radially extending portion of the ring. In a second example of the system, optionally including the first example, the axially extending portion of the ring may be formed between a first lateral surface and second lateral surface by first inner surface within a first inner diameter of the ring. In a third example of the system, optionally including one or both of the first and second examples, the radially extending portion of the ring may be formed by a lateral surface of an inner ring enclosed by first inner diameter of the ring, and the axial surface of the ring positioned in contact with the exterior of the shaft is a may be a second inner surface within an inner diameter of the inner ring. In a fourth example of the system, optionally including one or more or each of the first through third examples, the surface of the first gear is a gear root and the lubricant flow from the one or more holes along the radially extending portion of the ring, then the lubricant flow along the axially extending portion of the ring and into the gear root of the first gear. In a fifth example of the system, optionally including one or more or each of the first through fourth examples, the axially extending portion of the ring and radially extending portion of the ring form a cutout, that may receive, collect, and redirect fluid returned from the surface of the first gear. In a sixth example of the system, optionally including one or more or each of the first through fifth examples, the cutout may extend radially 360 degrees within a first inner diameter of the ring. In a seventh example of the system, optionally including one or more or each of the first through sixth examples, the ring may be located between the first gear of one or more gears and a second gear of another one or more gears located axially away from the first gear along the shaft. In an eighth example of the system, optionally including one or more or each of the first through seventh examples, within a second inner diameter of the radially extending portion of the ring there may be a bearing between the ring and the shaft, wherein the bearing may support and allow the ring to rotate about the shaft. In a ninth example of the system, optionally including one or more or each of the first through eighth examples, there may be a bearing surrounding an outer diameter of the ring, wherein the bearing surrounds the ring to support and allow the ring to rotate with the shaft. The disclosure also provides support for a system comprising: a shaft comprising one or more holes oriented radially within the shaft, one or more gears positioned circumferentially around the shaft, a ring positioned circumferentially around the shaft and the ring shaped with a radially extending portion and an axially extending portion, the axially extending portion of the ring may abut and be coupled to the shaft by a shoulder. In a first example of the system, the shoulder and axially extending portion of the ring may couple the ring to the shaft. In a second example of the system, optionally including the first example, within a second inner diameter of the radially extending portion of the ring there may be a bearing between the ring and the shaft, wherein the bearing surrounds the ring to support and allow the ring to rotate, and the bearing may abut the shoulder.

The invention claimed is:

1. A system comprising:
a shaft comprising one or more lubricant holes oriented radially within the shaft;
one or more gears positioned radially around a central axis of the shaft;
a ring positioned circumferentially around the shaft and the ring shaped with a radially extending portion and an axially extending portion, the axially extending portion directing lubricant flow from the one or more lubricant holes in an axial direction towards the one or more gears, wherein an axial surface of the ring is positioned in contact with an exterior of the shaft.

2. The system of claim 1, wherein the axially extending portion of the ring overlaps an exit of the one or more lubricant holes.

3. The system of claim 1, wherein the radially extending portion of the ring extends in a direction of the central axis of the one or more lubricant holes and the axially extending portion of the ring extends from the radially extending portion of the ring to intersect the central axis of the one or more lubricant holes.

4. The system of claim 3, wherein lubricant flows radially outward from the one or more lubricant holes, then flows along the radially extending portion of the ring, and then flows along the axially extending portion of the ring.

5. The system of claim 1, wherein the axially extending portion of the ring extends in a direction of the one or more gears.

6. The system of claim 1, wherein the shaft is a sun shaft of a Ravigneaux gearset and the one or more gears are part of the Ravigneaux gearset.

7. The system of claim 1, wherein passages formed by teeth of the one or more gears receive lubricant flow from the ring and the ring receives lubricant flow from the one or more lubricant holes.

8. A system comprising:
a shaft comprising one or more holes oriented radially within the shaft;
one or more gears positioned circumferentially around the shaft;
a ring positioned circumferentially around the shaft and the ring shaped with a radially extending portion and an axially extending portion, the axially extending portion of the ring directing lubricant flow from the one or more holes to a surface of a first gear of the one or more gears, wherein an axial surface of the ring is positioned in contact with an exterior of the shaft.

9. The system of claim 8, wherein a curved surface of the ring forms the axially extending portion of the ring and the radially extending portion of the ring, the curved surface of the ring in direct contact with an outlet of the one or more holes.

10. The system of claim 9, wherein the axially extending portion of the ring may be formed between a first lateral surface and second lateral surface by first inner surface within a first inner diameter of the ring.

11. The system of claim 10, wherein the radially extending portion of the ring may be formed by a lateral surface of an inner ring enclosed by first inner diameter of the ring; and the axial surface of the ring positioned in contact with the exterior of the shaft is a may be a second inner surface within an inner diameter of the inner ring.

12. The system of claim 8, wherein the surface of the first gear is a gear root and the lubricant flow from the one or more holes along the radially extending portion of the ring, then the lubricant flow along the axially extending portion of the ring and into the gear root of the first gear.

13. The system of claim 12, wherein the axially extending portion of the ring and radially extending portion of the ring form a cutout, that may receive, collect, and redirect fluid returned from the surface of the first gear.

14. The system of claim 13, wherein the cutout may extend radially 360 degrees within a first inner diameter of the ring.

15. The system of claim 8, wherein the ring may be located between the first gear of one or more gears and a second gear of another one or more gears located axially away from the first gear along the shaft.

16. The system of claim 8, wherein within a second inner diameter of the radially extending portion of the ring there may be a bearing between the ring and the shaft, wherein the bearing may support and allow the ring to rotate about the shaft.

17. The system of claim 8, wherein there may be a bearing surrounding an outer diameter of the ring, wherein the bearing surrounds the ring to support and allow the ring to rotate with the shaft.

18. A system comprising:
a shaft comprising one or more holes oriented radially within the shaft;
one or more gears positioned circumferentially around the shaft;
a ring positioned circumferentially around the shaft and the ring shaped with a radially extending portion and an axially extending portion, the axially extending portion of the ring may abut and be coupled to the shaft by a shoulder, wherein an axial surface of the ring is positioned in contact with an exterior of the shaft.

19. The system of claim 18, wherein the shoulder and axially extending portion of the ring may couple the ring to the shaft.

20. The system of claim 18, where within a second inner diameter of the radially extending portion of the ring there may be a bearing between the ring and the shaft, wherein the bearing surrounds the ring to support and allow the ring to rotate, and the bearing may abut the shoulder.

* * * * *